United States Patent

Memarzadeh

[11] Patent Number: 5,283,557
[45] Date of Patent: Feb. 1, 1994

[54] METHOD FOR CONVERTING HIGH RESOLUTION DATA INTO LOWER RESOLUTION DATA

[75] Inventor: Kazem Memarzadeh, Cambridge, Ohio

[73] Assignee: NCR Corporation, Dayton, Ohio

[21] Appl. No.: 725,171

[22] Filed: Jul. 5, 1991

[51] Int. Cl.$^5$ .......................... G09G 3/02; G09G 1/10
[52] U.S. Cl. ..................................... 345/132; 345/157
[58] Field of Search ............. 340/707, 709, 712, 730, 340/731, 728, 735, 747, 748, 751, 739, 793; 178/19; 358/443, 447; 395/128, 132

[56] References Cited

U.S. PATENT DOCUMENTS

| | | | |
|---|---|---|---|
| 3,832,693 | 8/1974 | Ishizaki et al. | 340/207 |
| 4,437,122 | 3/1984 | Walsh et al. | 340/730 |
| 4,439,762 | 3/1984 | Van Vliét et al. | 340/750 |
| 4,578,812 | 3/1986 | Yui | 382/41 |
| 4,698,768 | 10/1987 | Thuy et al. | 364/521 |
| 4,829,587 | 5/1989 | Glazer et al. | 382/47 |
| 4,839,634 | 6/1989 | More et al. | 178/18 |
| 4,873,515 | 10/1989 | Dickson et al. | 340/728 |
| 4,907,282 | 3/1990 | Daly et al. | 382/9 |
| 4,939,671 | 7/1990 | Sasser | 340/739 |
| 4,942,621 | 7/1990 | Angwin | 382/59 |
| 4,975,785 | 12/1990 | Kantor | 358/447 |
| 4,977,602 | 12/1990 | Beato | 382/27 |
| 4,979,229 | 12/1990 | Moolenaar | 382/56 |

*Primary Examiner*—Ulysses Weldon
*Assistant Examiner*—Amare Mengistu
*Attorney, Agent, or Firm*—Albert L. Sessler, Jr.

[57] ABSTRACT

A method for mapping sampled patterns into a lower resolution display device whereby a continuous image of the sampled pattern is reproduced. The method comprises determining the pixel location of each element of high resolution sampled data and the relative location within the pixel, deciding whether the pixels corresponding to the mapped data points should be included in the image, and graphically connecting selected pixels which are separated by one or more pixels. The process of pixel selection is aided by dividing each pixel into two separate areas, the boundary of which is determined by a predetermined geometric shape such as a diamond or circle which is entirely contained within a pixel. If a high resolution sampled data point or a connecting line falls within that predetermined geometric shape inside the pixel, then that pixel is selected, whereas data points falling outside the predetermined area within the pixel do not select that pixel for activation.

20 Claims, 18 Drawing Sheets

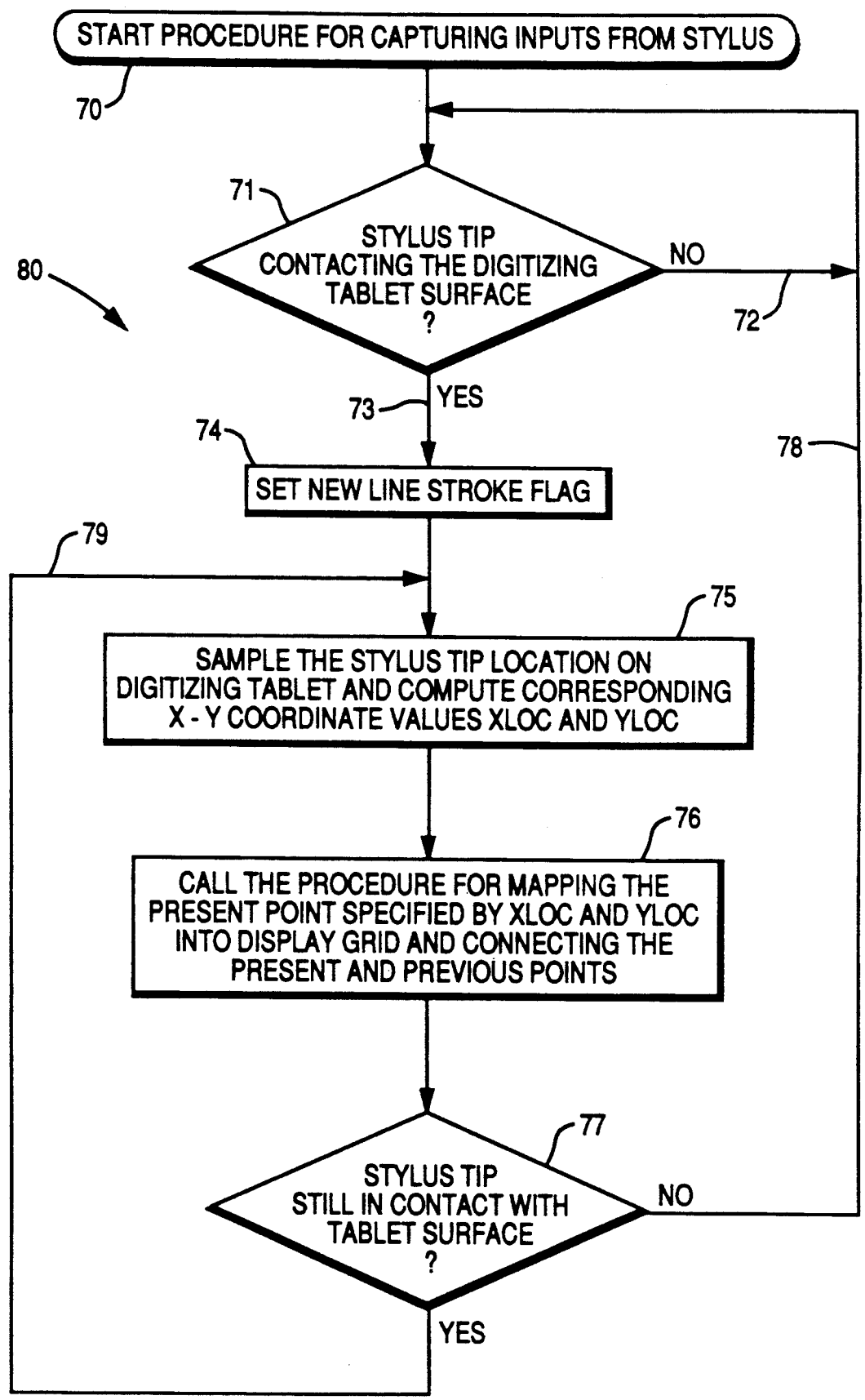

METHOD FOR CONVERTING HIGH RESOLUTION DATA INTO LOWER RESOLUTION DATA

BACKGROUND OF THE INVENTION

This invention describes a method for mapping of a high resolution digital image into a lower resolution frame, and more specifically describes a method of mapping handwritten scripts in the form of high resolution digital data into a lower resolution frame such as a Liquid Crystal Display (LCD).

As used herein, the term "mapping" refers to the process of selection of the appropriate pixels in the lower resolution display in order to form a visual image of a higher resolution digital image on the display device, and does not include any offset or skewing correction between the high resolution and the lower resolution frames. The offset and skewing errors can be corrected as described in U.S. patent application Ser. No. 640,321 U.S. Pat. No. 5,115,107, filed Jan. 11, 1991, inventor John F. Crooks et al, titled "Method of Correcting Skew Between a Digitizer and a Digital Design", and commonly assigned with the present application. Said application is incorporated herein by reference.

In many systems such as PC notebooks and signature capture and verification devices, typically handwritten scripts are electronically captured and visually displayed on a panel such as an LCD. An example of such a system may be seen in U.S. patent application Ser. No. 575,096 filed Aug. 30, 1990, and commonly assigned with the present application. Said application is incorporated herein by reference. In that system, an LCD module which is operatively connected to a microprocessor is placed directly behind a transparent digitizer, which is operatively behind a transparent digitizer, which is operatively connected to the microprocessor whereby positional and script inputs are captured via a stylus operatively connected to the digitizer. As the stylus is used to input script information, the LCD module is driven by the microprocessor to display the image traced by the stylus.

The visual quality of the traced image displayed on the display device is primarily determined by the resolution of the digitizer, the resolution of the display device, and the sampling rate of the digitizer. Typically, the resolution of the digitizer (approximately 500 dots/inch) is much higher than the resolution of the display device (approximately 75 dots/inch) because of the higher costs of the higher resolution displays and the memory elements required for the operation thereof. Thus, the visual quality of the image traced by the stylus and displayed on the display device is essentially determined by the resolution of the display device.

In such systems, where the display device has a lower resolution than the digitizer, in order to display a visual image of a pattern traced by the stylus tip, the samples obtained by the digitizer which are in the form of a high resolution digital data must be mapped into the display grid. In prior art techniques, the higher resolution digitizer data is first truncated or rounded off to the resolution of the display device, and thereafter a visual image is formed by the activation of those display pixels corresponding to the truncated or rounded off data and the graphical connection of those display pixels representing lines. However, such techniques do not always yield the best visual image of the pattern being presented by the display device, more particularly in the cases where the high resolution digital samples of the traced pattern are closely spaced on the display grid. The poorer visual quality of the displayed pattern is mainly caused by the ineffective selection of display device pixels corresponding to the digital image and the poor method of the graphical connection of those pixels forming a line.

SUMMARY OF THE INVENTION

This invention describes a new method for effective mapping of a high resolution digital image into a lower resolution frame of a display device whereby a visual image of the digital data can be presented in the form of a set of selectively activated display grid pixels.

In a preferred embodiment of the invention, the pattern being presented by the display device is produced by a digitizer which includes a digitizing tablet operatively connected to a microprocessor, and a stylus operatively connected to the digitizing tablet. As the stylus tip is moved on the surface of the digitizing tablet, the electrical signals containing coordinate information are picked up by the stylus and converted into digital X-Y coordinate values by the digitizer. The microprocessor then uses such X-Y coordinate values to drive the display device to form a visual image of the pattern being traced by the stylus. Typically, the location of the stylus and the X-Y coordinate values thereof are sampled at a fixed rate and when the digitized pattern is reproduced on a display device in order to obtain a continuous image, the sampled data points spaced by one or more pixels must be connected by additional pixels.

The method of the present invention provides an improved means by which such sampled patterns can be mapped into and connected on a lower resolution display device whereby a continuous image of the sampled pattern is reproduced. The method consists of determining the pixel location of each high resolution sampled data point and the relative location within the pixel thereof, deciding whether the pixels corresponding to the mapped data points should be included in the image, and the graphical connection of such selected pixels which are separated by one or more pixels.

The process of pixel selection is aided by dividing each pixel into two separate areas, the boundary of which is determined by a predefined geometric shape such as a diamond or a circle which is entirely contained within a pixel. If a high resolution sampled data point falls within that predefined geometric shape inside the pixel then that pixel is selected, whereas data points falling outside the predefined area within the pixel do not select that pixel for activation.

A similar rule is employed for graphical connection of high resolution sampled data points which form a line. The pixels selected for forming a straight line between two pixels are those in which the predefined or predetermined areas are crossed by the straight line connecting the two high resolution sampled data points. Accordingly, if the line connecting two high resolution sampled data points crosses a pixel only in an area which is outside the predefined area, then that pixel is not selected for graphically connecting the two data points on the display.

It is accordingly an object of the present invention to provide an improved method for mapping a high resolution digital image into a lower resolution display device.

A further object of this invention is to provide an improved method for mapping images captured by a stylus-activated digitizer into a lower resolution display.

A further object is to provide an improved method for converting high resolution data into lower resolution data in the form of pixels, with each pixel being divided by a geometrical shape into active and passive areas, and only those pixels being selected in which a sampled data point or a connecting line falls within or crosses an active area.

With these and other objects, which will become apparent from the following description, in view, the invention includes certain novel features of construction and combinations of parts, a preferred form or embodiment of which is hereinafter described with reference to the drawings which accompany and form a part of this specification.

BRIEF DESCRIPTION OF THE DRAWINGS

FIG. 4 is a flow diagram broadly showing the use of the process of the present invention in a system such as is shown in FIG. 1.

DETAILED DESCRIPTION

Figure 1:
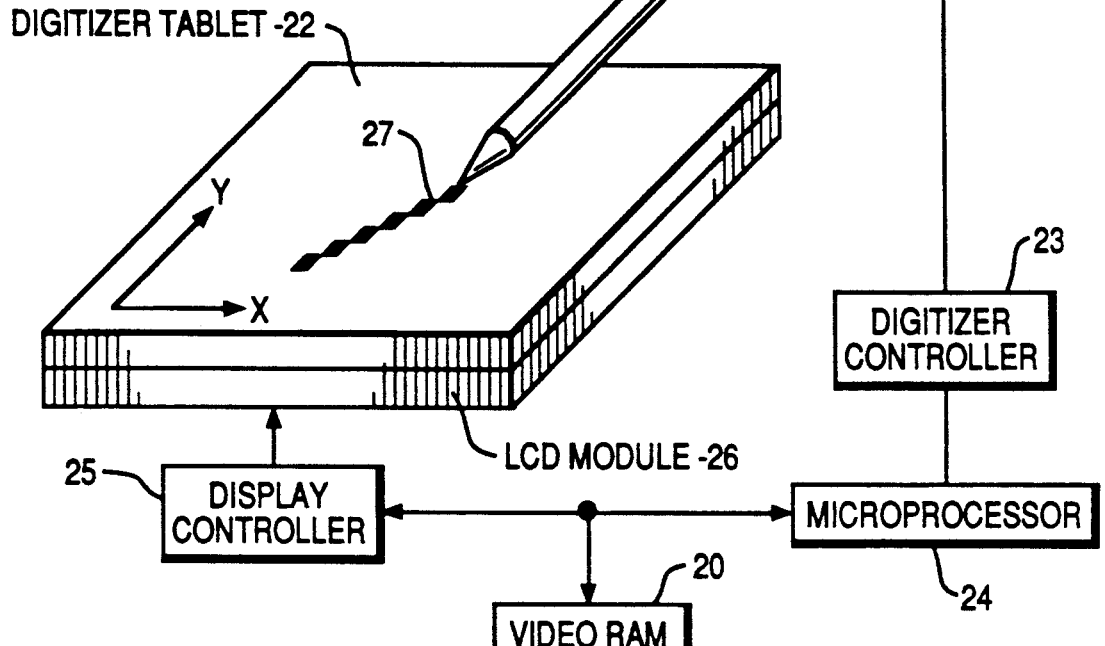
FIG. 1 is a perspective diagrammatic view of a system in which the present invention may be employed.

FIG. 1 illustrates a system in which an image traced by a stylus 21 may be generated in accordance with the method of this invention and visually presented on a display device. The system includes a transparent digitizing tablet 22 which is placed over an LCD module or display 26. As stylus 21 is moved along and in contact with the surface of the digitizing tablet 22, the X and Y electrical signals picked up by stylus 21 are sampled and digitized by digitizer controller 23, and the digital values of the X and Y coordinates are passed on to microprocessor 24. The coordinate information of stylus 21 is then used by microprocessor 24 to generate a bit mapped image of the pattern being traced by stylus 21. LCD module 26 is then driven by microprocessor 24 via LCD controller 25 to display image 27 traced by stylus 1. A video random access memory (RAM) 20 stores the bit mapped image for the display 26 and is coupled to the display 26 and the microprocessor 24.

Figure 2A:
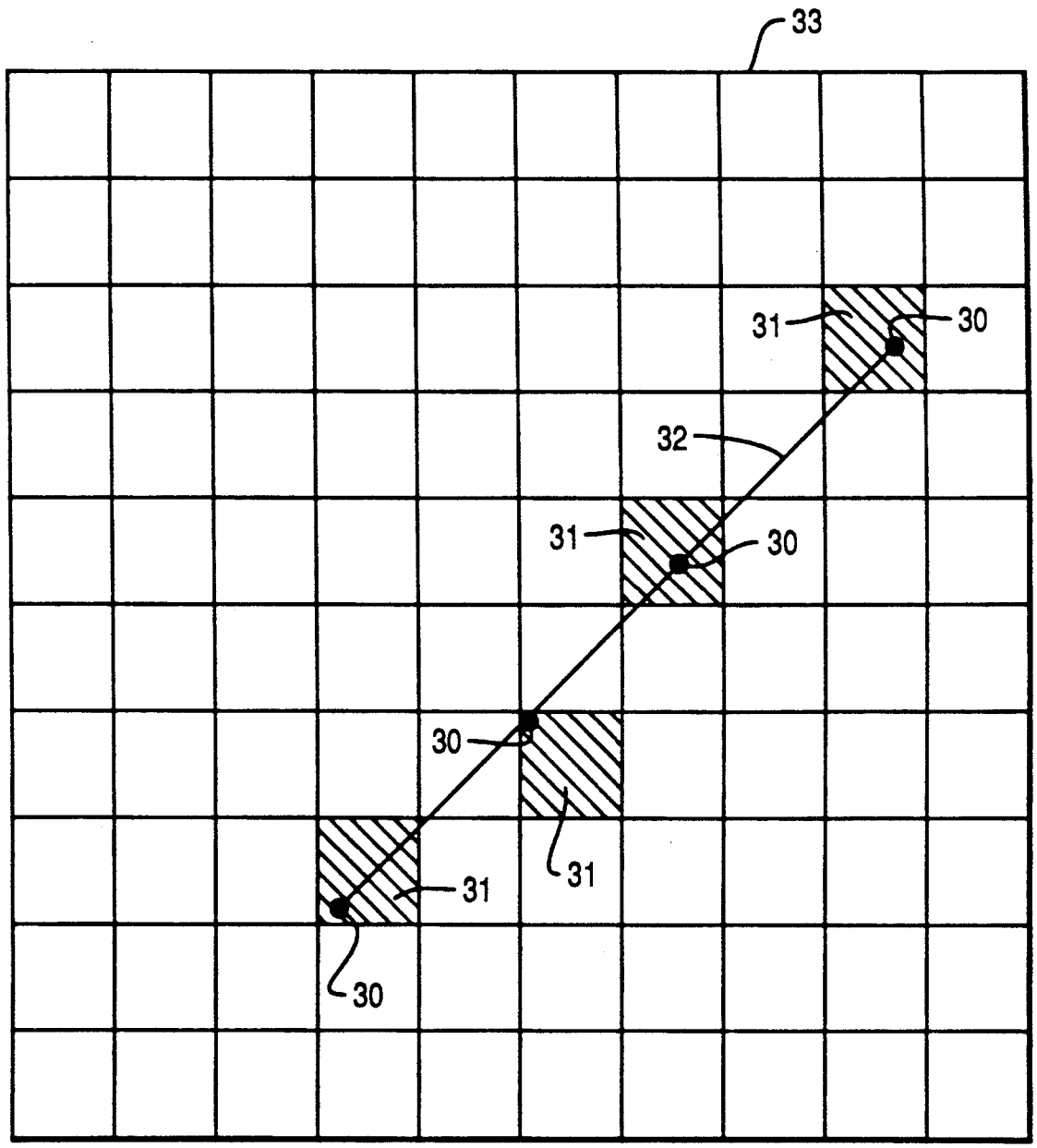
FIG. 2A shows a graphical representation of a line in which pixels forming the line are separated.

Based on the prior art techniques, in order to create a bit mapped image of a typical sampled and digitized line stroke such as line 32 shown in FIG. 2A, for each sampled X and Y coordinate pair 30 the corresponding LCD pixel 31 is determined first. In addition, for the practical sampling rates of 50 to 200 samples per second, usually the sampled X and Y coordinate pairs 30 for a continuous line stroke like line 32 may be separated by one or more pixels, as shown by way of example in FIG. 2A. Thus, such pixels must be graphically connected by activation of additional pixels such that a continuous image is formed on LCD pixel grid 33.

Figure 2B:
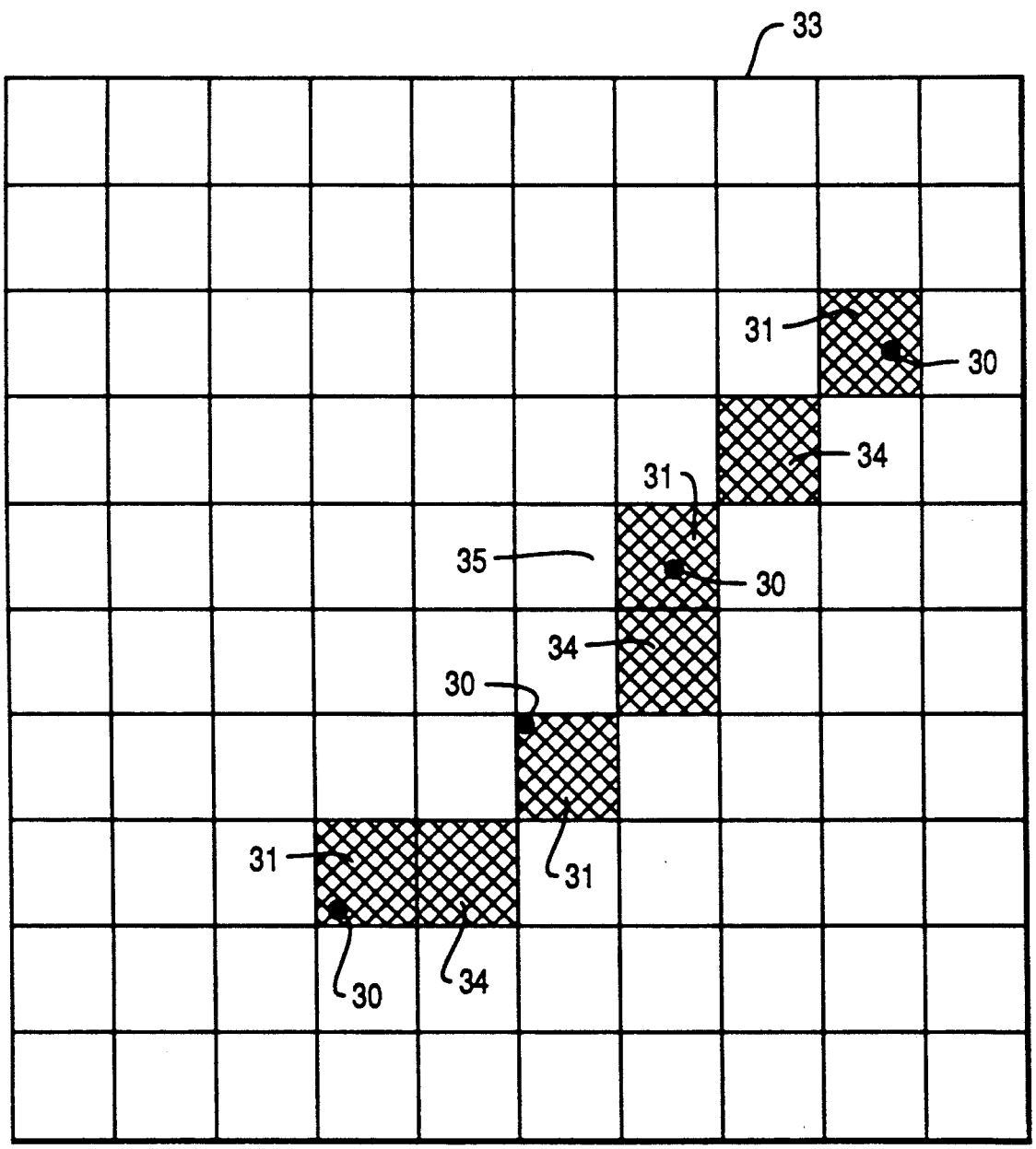
FIG. 2B shows a graphical representation of a line similar to that shown in FIG. 2A, in which additional pixels have been added between the separated pixels.

The additional pixels necessary for graphical connection of pixels 31 can then be selected using antialiasing techniques. Aliasing refers to the case in which there are more pixels between two points in the X direction than in the Y direction, or vice versa. Using such a technique results in the addition of pixels 34 as illustrated in FIG. 2B. As can be seen, resulting image 35 does not very well represent original line 32 shown in FIG. 2A. The poor line image obtained by following the aforementioned prior art method is caused by two main factors. First, the process of selecting pixels 31 was not effective, and second the additional pixels 34 for connecting pixels 31 were not chosen effectively.

As an alternative, the present invention provides an improved method of mapping taking full advantage of the higher resolution of the digitizer data in the mapping process, and by partitioning the area within each pixel into two separate active and passive areas. Accordingly, sampled data points falling within the passive area and lines which cross only the passive area within a given pixel will not select that pixel, whereas for an active area such conditions results in selection of the pixel. As a preferred shape for defining the boundary between the active and passive areas within a pixel, FIG. 2C shows a diamond shape 37 with staircase edges which will be used throughout the description of this preferred embodiment of the invention. The rule for pixel selection then dictates that any sampled X-Y coordinate pair 39 which falls within the active area enclosed by diamond 37 selects that pixel, whereas any data point 38 which is located outside diamond 37 does not select the pixel. It should be noted that the lines 37A extending outwardly from the remainder of the diamond 37 are considered to be part of the active area of the diamond 37. In addition, pixel 36 gets selected by a line only if that line passes through the diamond within the pixel as well as the the pixel itself. Thus, in FIG. 2C, line 41 would select pixel 36 but line 40 would not.

Figure 2D:
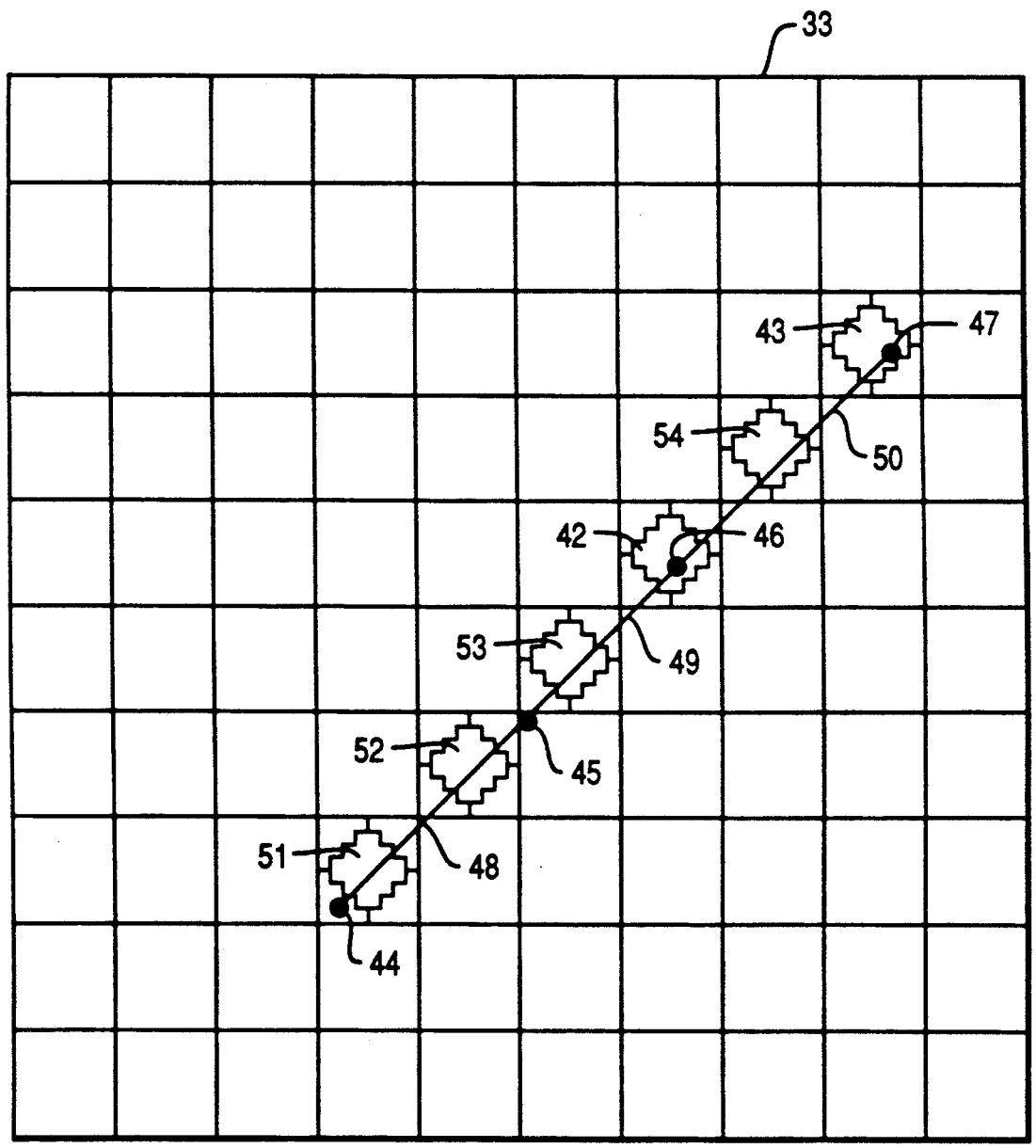
FIG. 2D shows a graphical representation of a line extending through a plurality of pixels having geometrical shapes superimposed thereon.
Figure 2C:
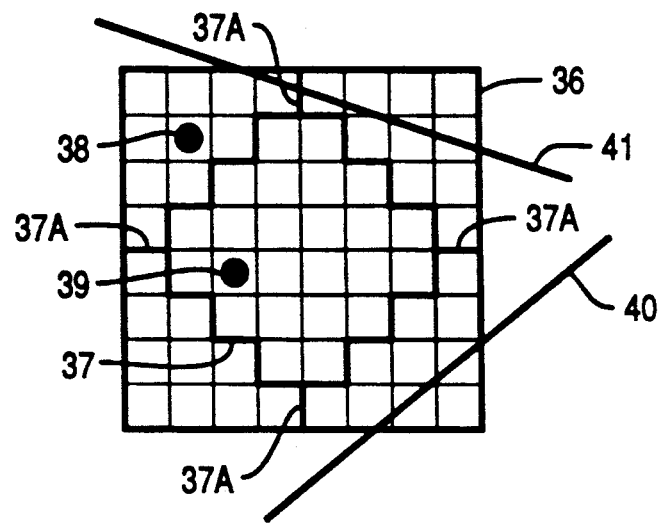
FIG. 2C shows a graphical representation of a pixel with a geometrical shape superimposed on the pixel within the boundaries of the pixel.

Following the above mentioned rules, line 32 shown in FIG. 2A is remapped into LCD grid 33 and the resulting image is shown in FIG. 2D. In that figure, starting at the beginning of the line stroke, neither point 44 nor point 45 select any pixels, however line 48 connecting points 44 and 45 crosses the diamond areas within pixels 51 and 52, thereby selecting these two pixels. Similarly, line 49 connecting points 45 and 46 crosses the diamond within pixel 53 which results in selection of that pixel. Point 46 selects pixel 42 and point 47 selects pixel 43, while line 50 connecting points 46 and 47 selects pixel 54, whereby pixels 42 and 43 are connected. This completes the bit mapped image for the line passing through points 44 to 47. It is apparent by comparing FIGS. 2A and 2D that following the method of present invention results in a much better image for line 32 shown in FIG. 2A.

Figure 3A:
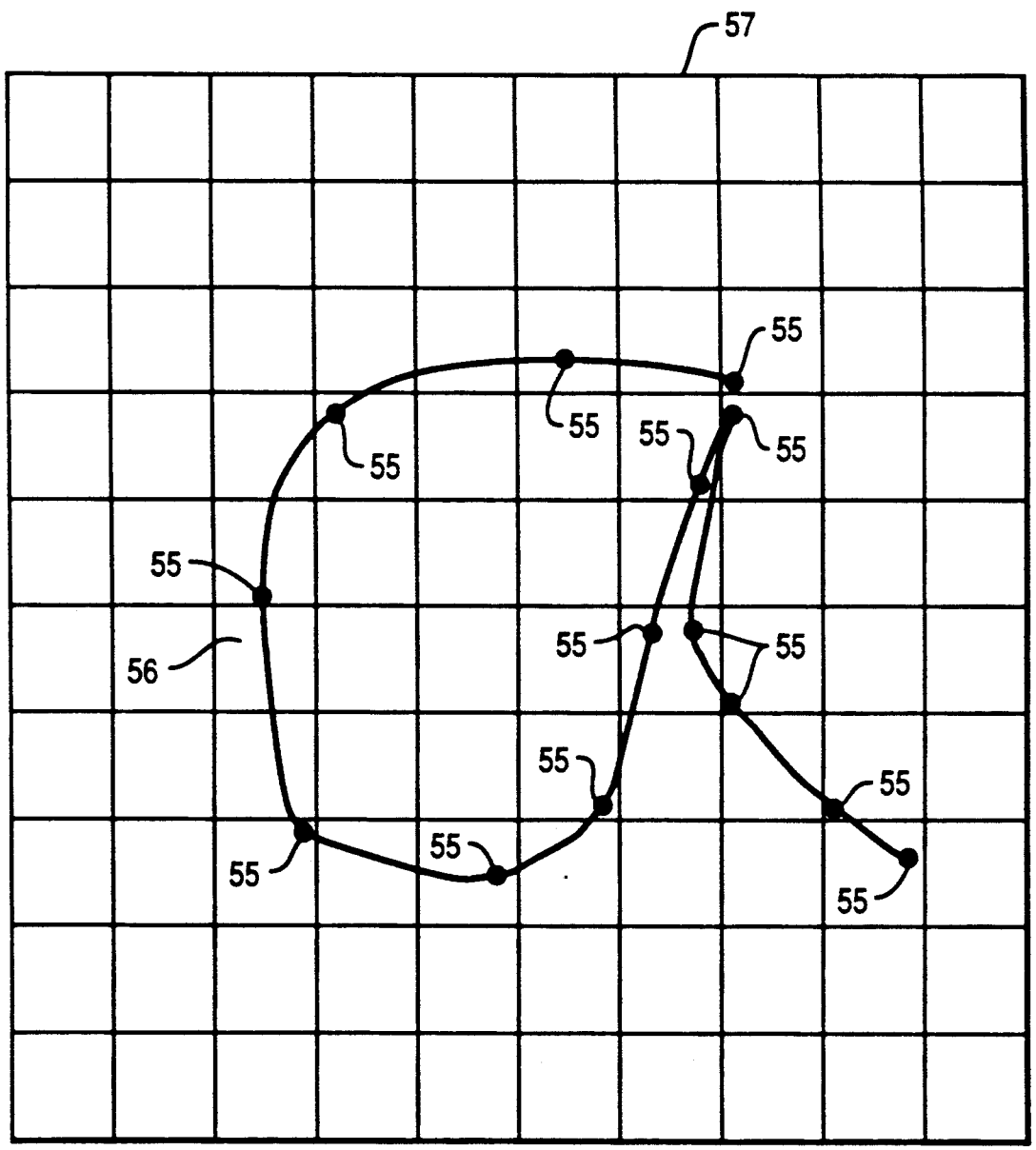
FIG. 3A shows data points and a line representing the letter "a" superimposed on a display grid.
Figure 3B:
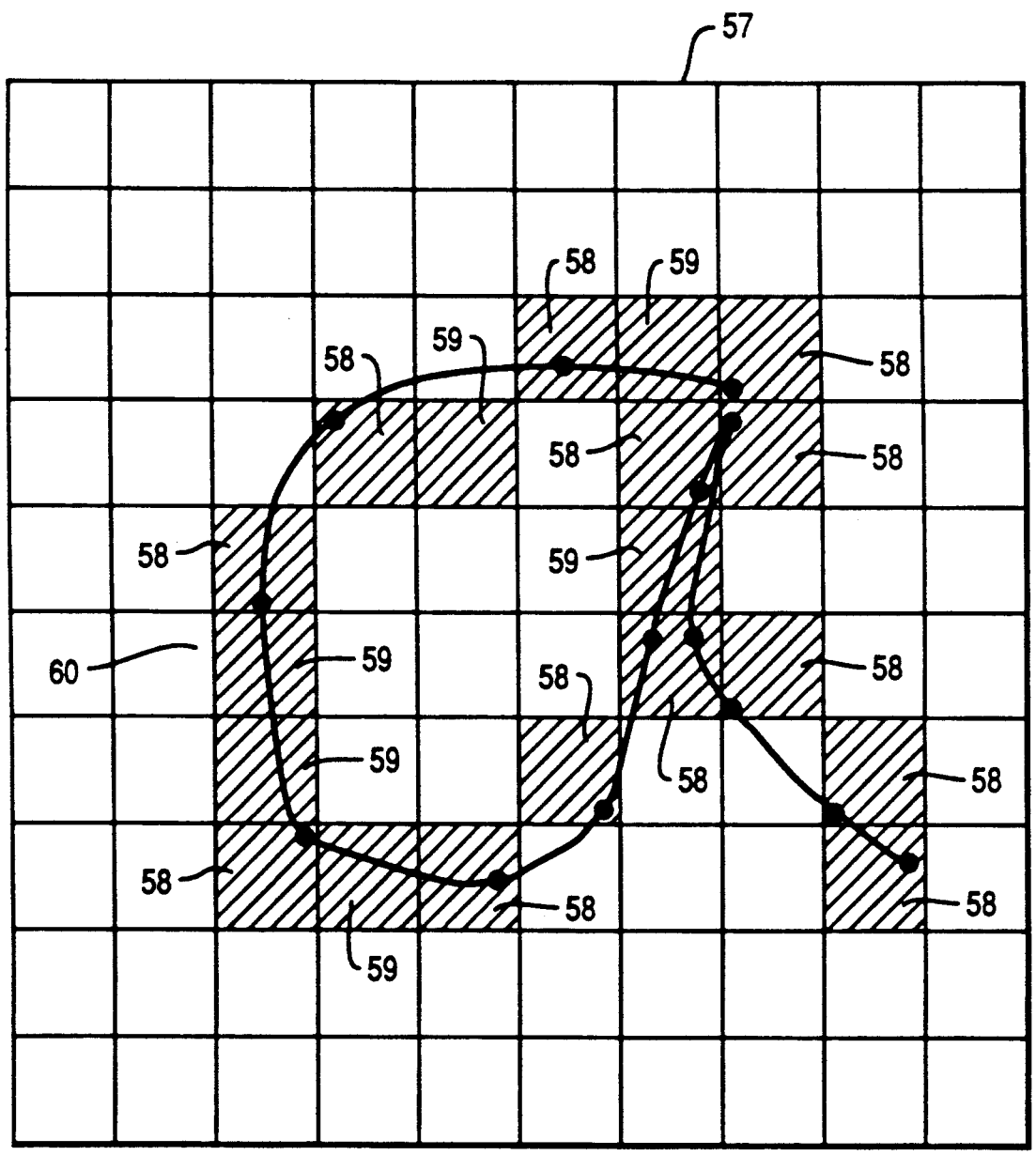
FIG. 3B shows pixels in a display grid activated to represent the letter "a" in accordance with a prior art mapping method.

As another example for illustrating some of the advantages of the present invention over other prior art methods, in FIG. 3A is shown a set of possible X-Y coordinate sample data points 55 for script letter "a" represented by reference character 56. Applying a typical prior art technique for mapping letter 56 into display grid 57 results in image 60 illustrated in FIG. 3B. In that figure, pixels 58 are selected by one or more data points located within these pixels, whereas pixels 59 are additionally chosen to connect those selected pixels separated by one or more unselected pixels.

Figure 3C:
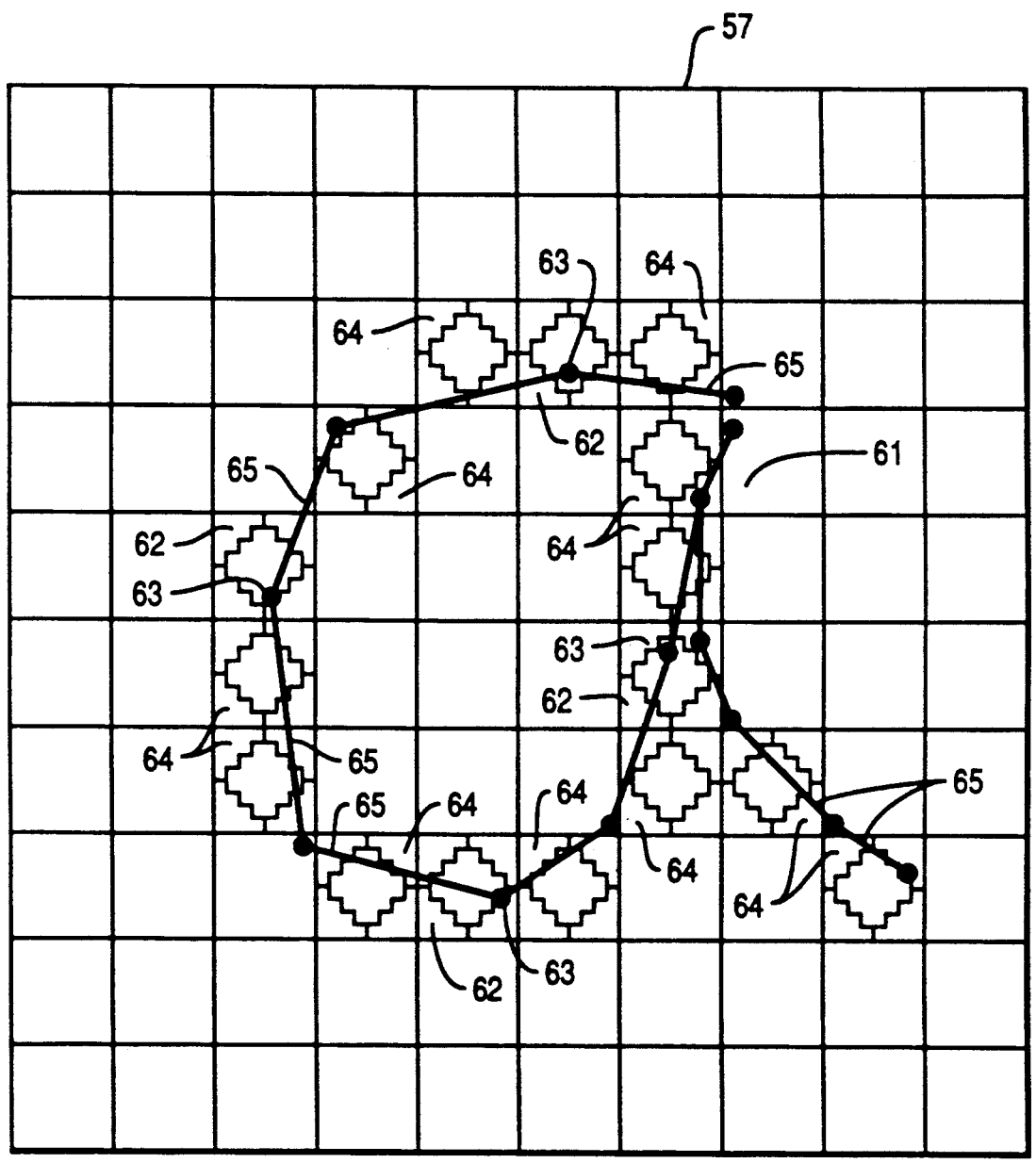
FIG. 3C shows pixels in a display grid activated to represent the letter "a" in accordance with the process of the present invention.

The image of the same letter 56 shown in FIG. 3A is remapped into a display grid 57 using the method of the present invention and the bit mapped image 61 thereof is depicted in FIG. 3C. Image 61 includes pixels 62 selected by data points 63 which reside inside the diamond areas of pixels 62. The remaining pixels 64 of image 61 are selected by lines 65 which pass through the diamond areas of pixels 64. As in the previous example, image 61 in FIG. 3C represents letter 56 of FIG. 3A more effectively than does image 60 in FIG. 3B.

FIG. 4 shows a flow diagram 80 illustrating a process which can be used in a system such as that shown in FIG. 1 in order to reproduce a visual image of any writing captured by the stylus and to present the image on a display device. Block 70 at the beginning of flow diagram 80 indicates the start of the process for accepting input from the stylus. Next, in block 71 the processor waits in a loop through path 72 if there is no input from the stylus 21. When the stylus tip comes into contact with the surface of the digitizing tablet 22, the processor proceeds via path 73 to block 74 where the start of a new line stroke is indicated by setting a flag inside the processor. The contact between the stylus tip and the digitizing tablet surface is normally indicated to the microprocessor by a status line from a miniature switch (not shown in the drawings here) mounted in the tip of the stylus. Next, the process continues in block 75, where the location of the stylus tip on the digitizing tablet is sampled and the corresponding X-Y coordinate values XLOC and YLOC are computed. Then, in block 76 the routine for mapping (XLOC,YLOC) point into the display grid is called. In addition, when (XLOC,YLOC) is not the first sample point of a new line stroke, the same routine called in block 76 connects the previous point (PXLOC,PYLOC) to the present point (XLOC,YLOC). The process then proceeds to block 77, in which the status of the stylus tip switch is checked again. If the stylus tip is still in contact with the digitizing tablet surface, then via path 79 the process branches back to block 75 where the next sample is taken. In the case where the stylus tip is no longer in contact with the digitizing tablet surface, i.e. the line stroke is terminated, the processor returns to block 71 via path 78 and waits for the next line stroke. The routine called in block 76 of procedure 80 will now be described in detail.

FIG. 5 illustrates a flow diagram 100 for the aforementioned routine which is a preferred implementation of the method of the present invention for mapping the digitizer data points into the display grid. For a better understanding of the mapping process, an example shown in FIG. 6 will be used throughout the description of the various blocks of flow diagram 100 and the subroutines called thereby.

Figure 6:
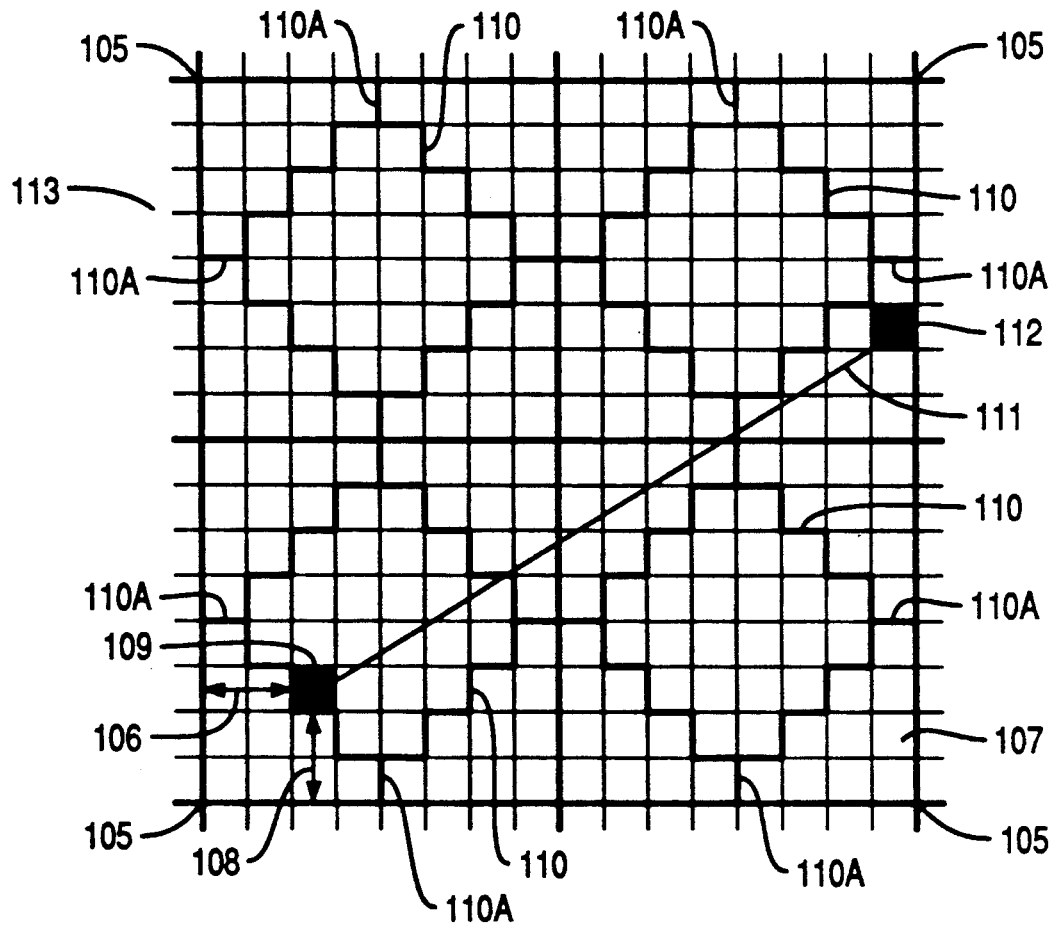
FIG. 6 is a diagram showing four pixels in a partial grid of a typical display device.

The example in FIG. 6 illustrates a partial grid 113 of a typical display device and shows four pixels 105, the boundaries of which are defined by the bigger squares with darker edges. Diamond shapes 110 having staircase edges and extended lines 110A define the boundaries of the active and passive areas used in selection of pixels, as will be shown later. The smaller squares 107 represent the higher resolution of the digitizing tablet 22 which for this example was chosen to be eight times the resolution of the display grid. Data points 109 and 112 are two consecutive sampled points of a line stroke being mapped into the display. It should be noted that only two samples of the line stroke are shown here for illustration purposes and that a typical line stroke may consist of many sampled points depending on the length of the line stroke, the speed of the stylus, and the digitizer sampling rate.

Referring back to FIG. 5A, routine 100 starts with block 85, which describes the purpose of the routine, and then moves on to block 86 in which the processor determines as a quotient the pixel location (ROW, COL), measured from the lower left corner of the display grid, corresponding to the present point (XLOC, YLOC), and in addition computes as a remainder (ROW REM,COL REM) which represents the relative location of the point (XLOC, YLOC) inside the pixel (ROW, COL). In the example of FIG. 6, assuming that point 109 is located at (XLOC, YLOC)=(162, 242) and is the first point of the line stroke being mapped into the display grid, then the location of pixel 105 corresponding to point 109 is given by quotients (ROW, COL)=(20, 30), and the relative location of point 109 inside the pixel is given by (ROW REM, COL REM)=(2, 2). These values were computed using a value of 8 for both PIXEL WIDTH and PIXEL HEIGHT.

Next, in block 87 the status of the new line-stroke is checked. Since point 109 was assumed to be the first point of a new line stroke, the new-line-stroke flag was set by routine 80 in FIG. 4. Thus, the processor branches to block 90 via path 88 where the new-line-stroke flag is cleared. In the following block 91, it is determined whether point 109 is located within the diamond shape 110 (FIG. 6). Therefore, before continuing with routine 100, the details of block 91 are discussed next.

Figure 7:
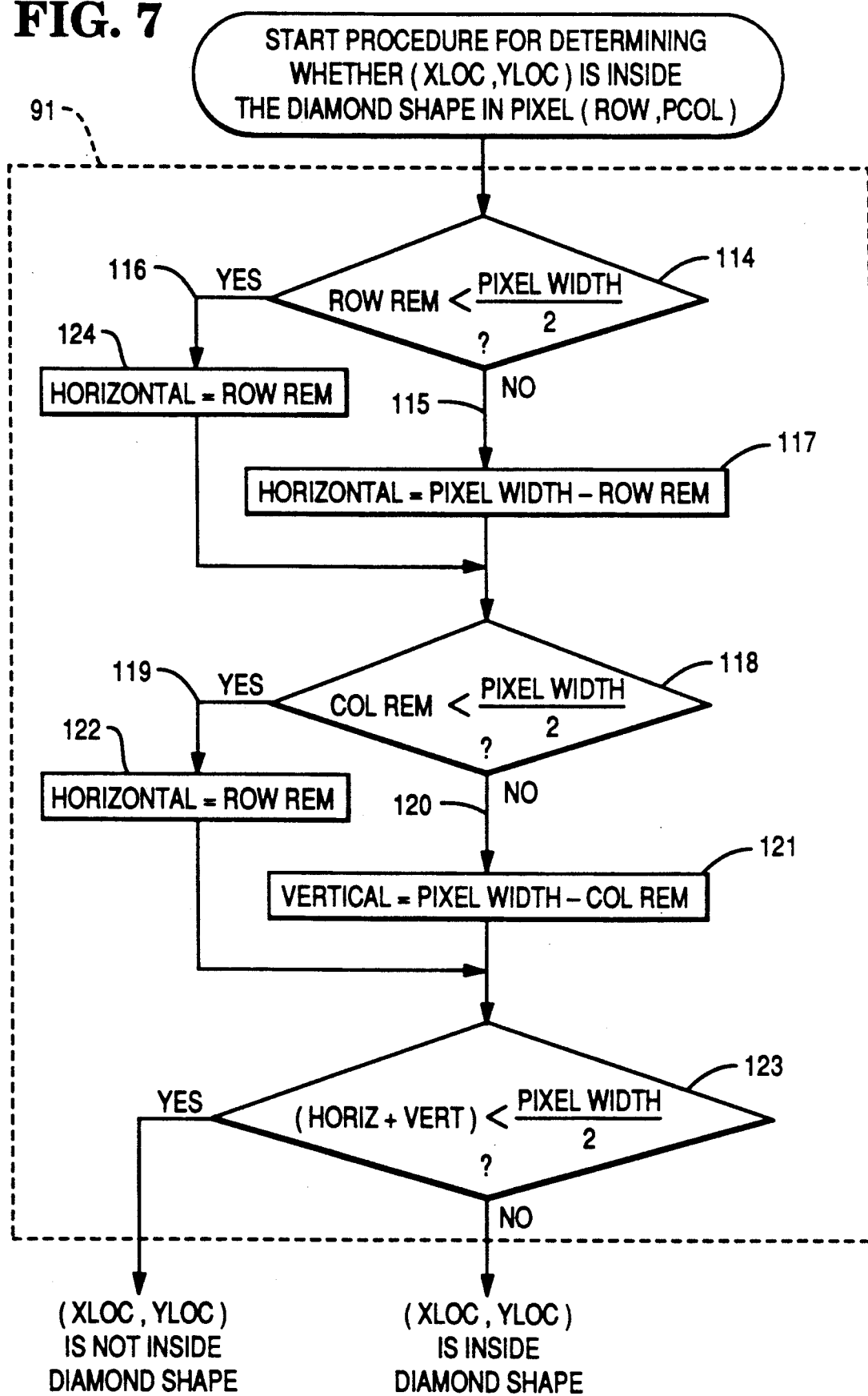
FIG. 7 is a flow diagram showing the process for determining whether a data point is within an active area of a pixel.

The flow diagram for a preferred implementation of block 91 is given in FIG. 7, in which the sequence begins with a statement 91A giving the purpose of the sequence, and then proceeds to block 114 where the relative horizontal location of point (XLOC, YLOC) inside pixel (ROW, COL) is checked to determine which horizontal half (left or right) of the pixel the point resides in. Referring to the example in FIG. 6, ROW REM 106 of point 109 is less than half of the pixel width. Hence, the sequence branches to block 124, where the value of HORIZ, which is the horizontal distance from point 109 to the nearest pixel edge, is set equal to ROW REM. If point 109 were in the right half of the pixel then the sequence would have branched to block 117 via path 115 whereby the value of HORIZ would be set to the distance from the point to the right edge of the pixel.

Next, the sequence moves to block 118 where the vertical location of point 109 is compared to half of the pixel width in order to determine whether point 109 is located in the lower half or upper half of the pixel. Again, since COL REM 108 of point 109 is smaller than half of the pixel width, the sequence via path 119 continues to block 122 where the value of the vertical distance from point 109 to the nearest edge, VERT, is set equal to COL REM. If point 109 were in the upper half of the pixel then the sequence would have proceeded to block 121 via path 120, and the value of VERT would be set equal to the distance from point 109 to the upper edge of the pixel. It should be noted that the process described herein is employed with a pixel of square shape, so that width and height are the same. For pixels of other configurations, such as a non-square rectangular shape, it would be necessary to modify the process.

Finally, in block 123, since the sum of HORIZ and VERT is not less than half the pixel width, it is concluded that point 109 is located inside diamond shape 110. A sum less than half the pixel width would have indicated that the point is outside the diamond shape.

Figure 5A:
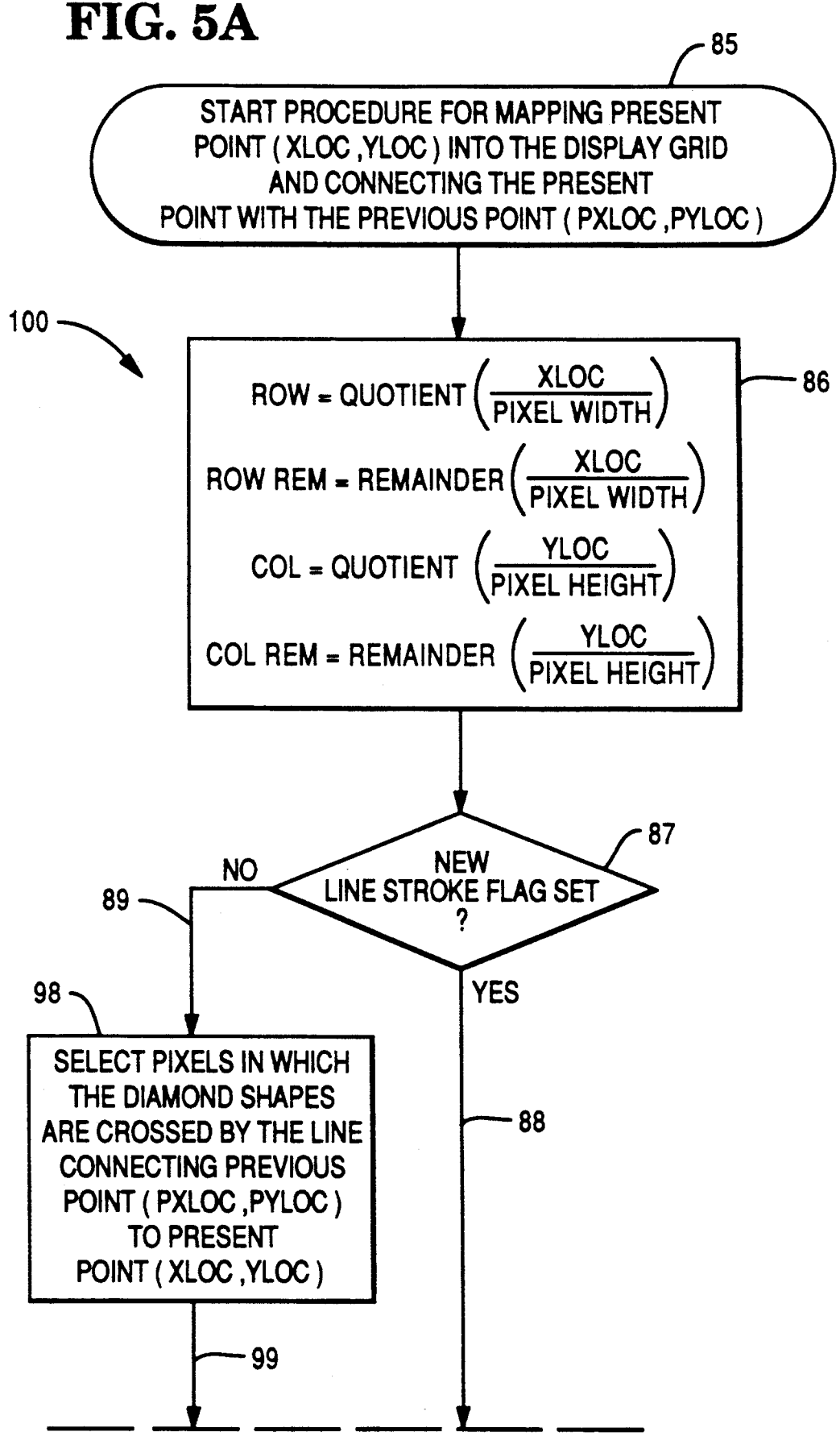
FIGS. 5A and 5B, taken together, constitute a flow diagram showing the mapping process of the present invention for mapping digitizer data points into a display grid.
Figure 5B:
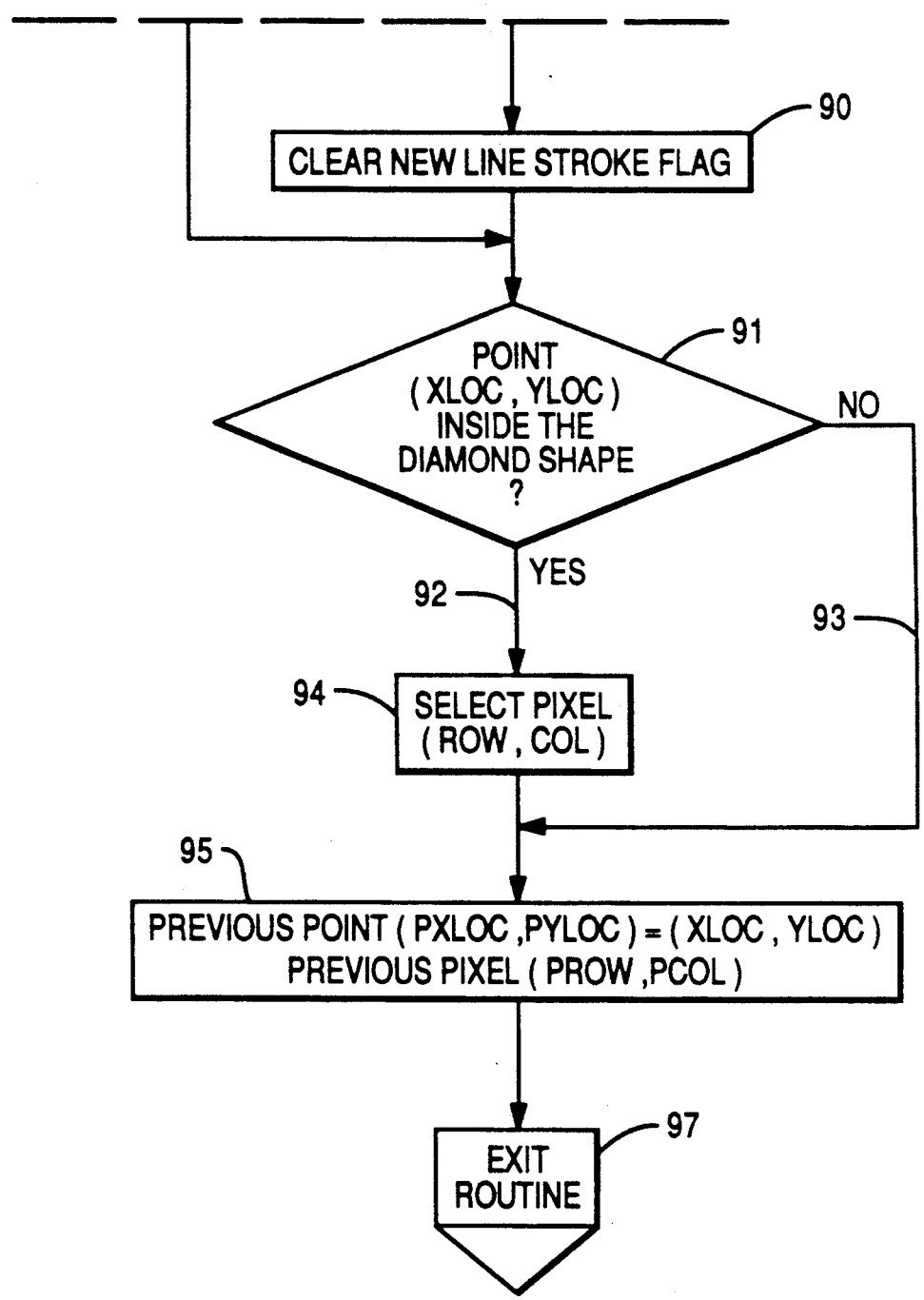

Referring back to routine 100 in FIG. 5A and continuing with the example illustrated in FIG. 6, now that it has been determined in block 91 that point 109 is within diamond 110, the process proceeds to block 94 (FIG. 5B) via path 92 where pixel 105 is selected as part of the pixels to form an image of line stroke 111. Had point 109 been located outside diamond 110, the process would have continued via path 93 to block 95, skipping block 94 in which the pixel would have been selected. At the end of routine 100, the present point and pixel now respectively become the new previous point and previous pixel, and the process then exits routine 100 back to routine 80 in which the next X-Y coordinate pair (XLOC, YLOC) is captured and routine 100 is called again to map this new point.

Therefore, starting at the top of routine 100, the values for (ROW, COL) and (ROW REM, COL REM) corresponding to point (XLOC, YLOC) are computed again in block 86. Next, in block 87, the process proceeds to block 98 via path 89, since the new-line-stroke flag is cleared, which indicates that the present point is not the first point of the line stroke. The function of block 98 is to determine the location of and select those pixels in which the diamond shapes are crossed by the line connecting the previous point to the present point.

Figure 8:
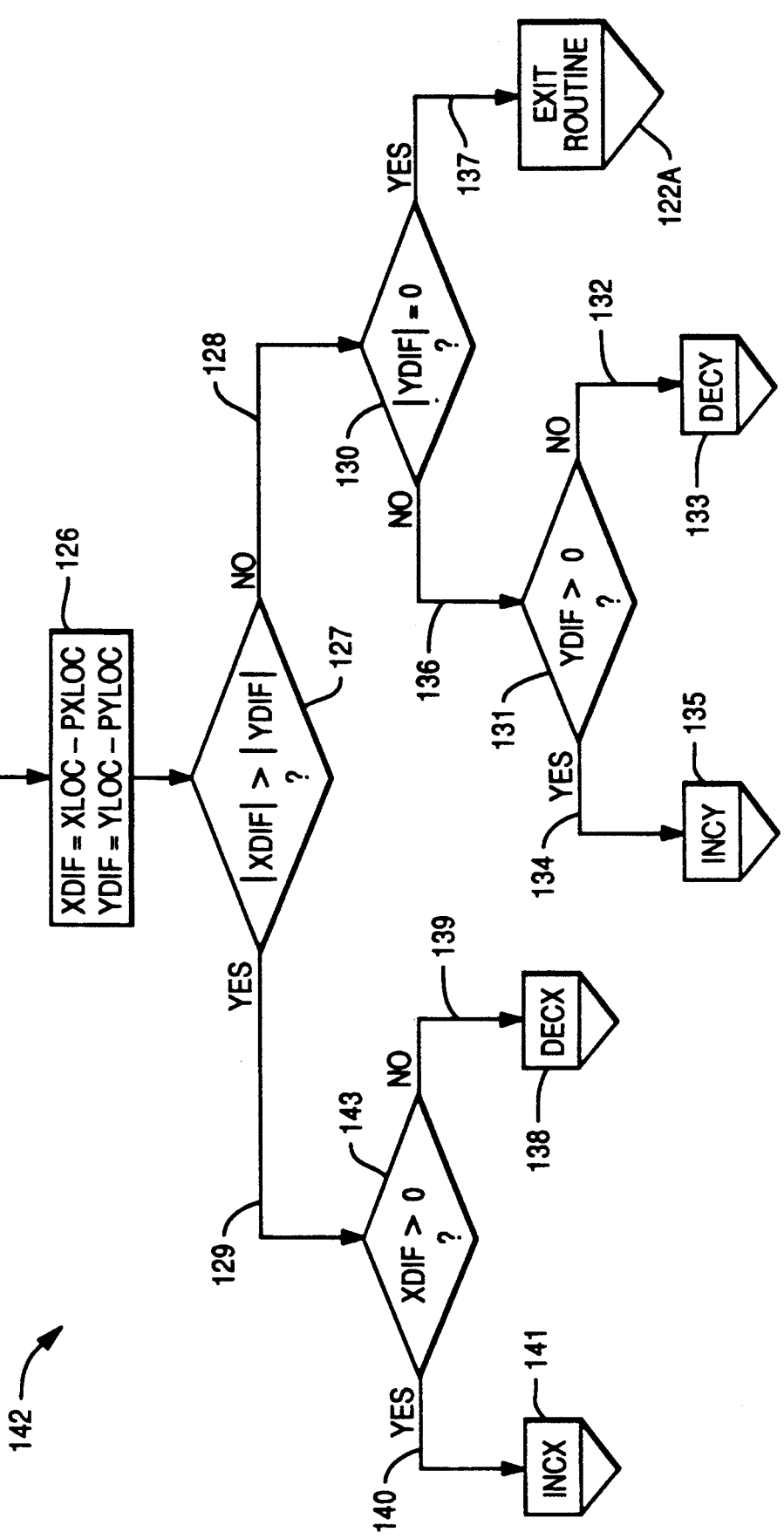
FIG. 8 is a flow diagram of the process for pixel selection.

FIG. 8 shows routine 142 which is a detailed flow diagram of block 98. Routine 142 first determines the direction of the line stroke and then determines which of the regions 125-128 of FIG. 9 corresponds to such direction. The process then proceeds to one of the subroutines 133, 135, 138, or 144 depending on which region the line stroke corresponds to.

The top block 125 in routine 142 gives a brief description of the routine 142. In the next block 126, the X and Y coordinate differences between the previous point (PXLOC, PYLOC) and the present point (XLOC, YLOC) are computed and the results are designated as (XDIF, YDIF). Next, in block 127, if the absolute value of YDIF is greater than or equal to the absolute value of XDIF then the processor branches via path 128 to block 130 from which the processor exits routine 142 via block 122A. The process returns to routine 100 if the absolute value of YDIF is equal to 0. Note that in order for the process to reach block 130, the absolute value of YDIF has to be greater than or equal to the absolute value of XDIF, and since the absolute value of YDIF is equal to zero then the absolute value of XDIF is also zero. This indicates that the previous point and the present point overlap and there is no need for connecting the two points.

On the other hand, if in block 130 it is determined that the absolute value of YDIF is not equal to zero then the process continues to block 131 where the sign of YDIF is examined. A positive value indicates that the line stroke is directed upward within region 146 of FIG. 9, and the process proceeds to subroutine 135 via path 134; whereas a negative YDIF means that the line is directed downward in region 148 and the process proceeds via path 132 to subroutine 133.

Going back to block 127, for the case in which the absolute value of YDIF is less than the absolute value of XDIF, the process proceeds to block 143 via path 129 in which the sign of XDIF is checked. For a positive XDIF the line is directed within region 145 and the process continues via path 140 to subroutine 141. A negative XDIF value directs the process via path 139 to subroutine 138 which corresponds to region 147 in FIG. 9.

Figure 9:
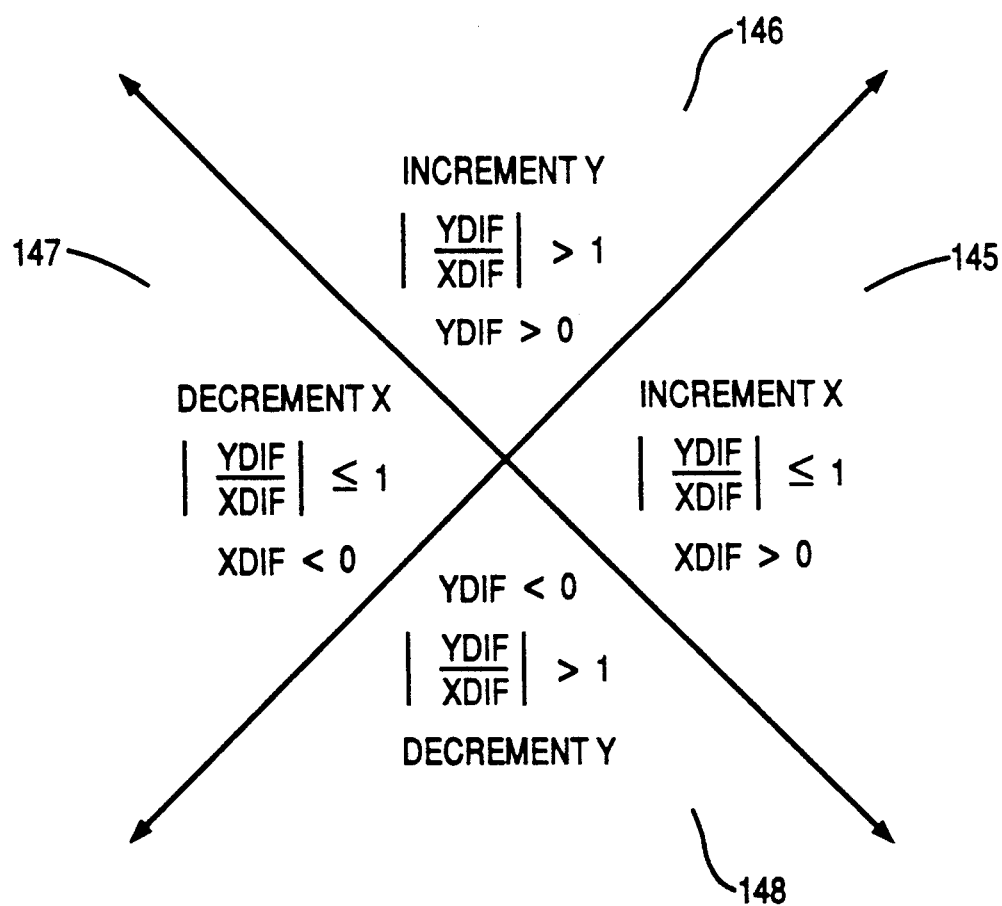
FIG. 9 is a diagram for determining the direction of a line stroke.

For the example given in FIG. 6, XDIF =13 and YDIF =8, which means that the line stroke is directed upward and in the positive X direction, i.e. region 145 in FIG. 9. Therefore, in routine 142 the processor proceeds to the INCX routine (referring to INCREMENT X) in block 141.

Flow diagrams of subroutines 133, 135, 138, and 141 for DECY, INCY, DECX and INCX, in FIGS. 13, 12, 11 and 10, respectively, are identical in structure and differ only in the parameters checked or operated on in various blocks. Therefore, only the flow diagram for subroutine 141 is discussed in detail, and the flow diagrams of the other three subroutines are given in FIGS. 11 through 13 for reference.

Figure 14:
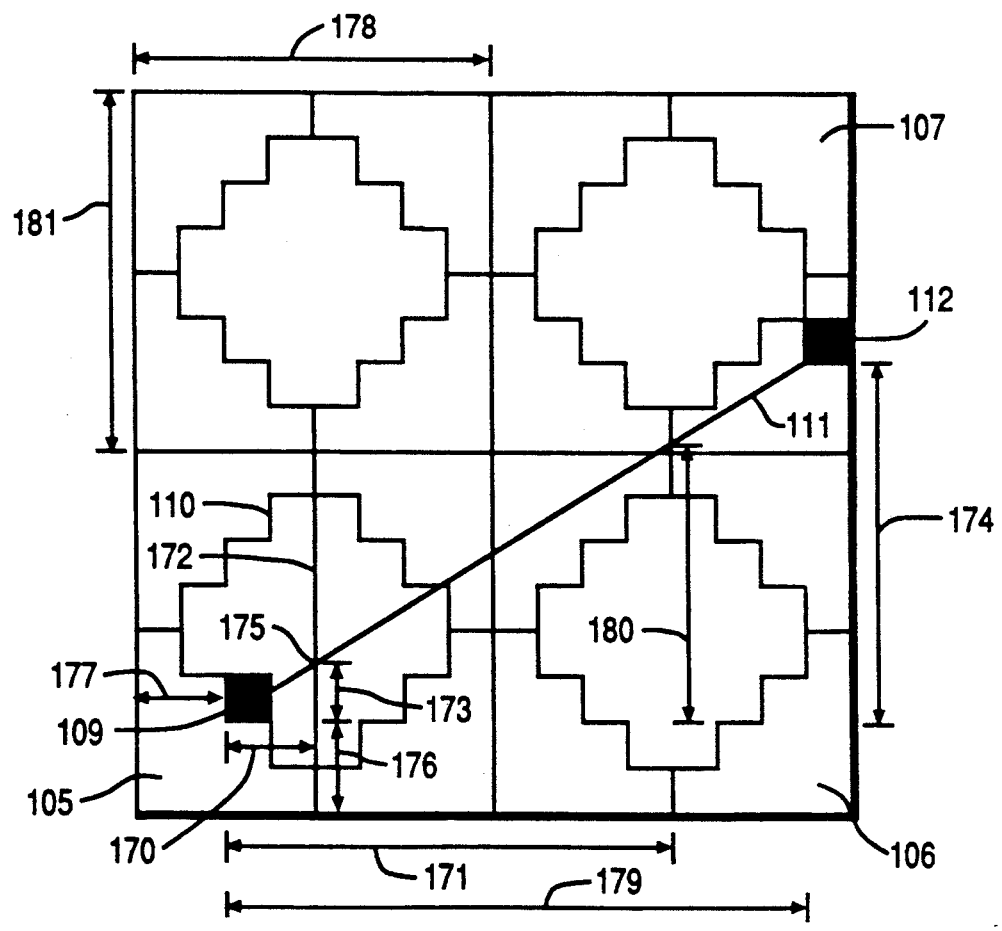
FIG. 14 is a diagram similar to FIG. 6 showing four pixels in a partial grid of a typical display device which is used in connection with the processes of FIGS. 10–13.

The example given in FIG. 6 is redrawn in FIG. 14 with some new critical dimensions marked which will facilitate the description of subroutine 141. Referring to FIG. 14, the basic idea in subroutine 141 is to compute the coordinate location of point 175 at which line 111 connecting previous point 109 to present point 112 crosses a vertical line 172 which bisects pixel 105 into two identical rectangles. Thus, if intersection point 175 is located within the pixel's upper and lower boundaries then line 111 passing through pixel 105 also crosses diamond shape 110 within pixel 105. It should be noted that this is by no means the only way to determine whether the line crossing a given pixel also passes the diamond shape, and other methods could be used successfully.

Figure 10:
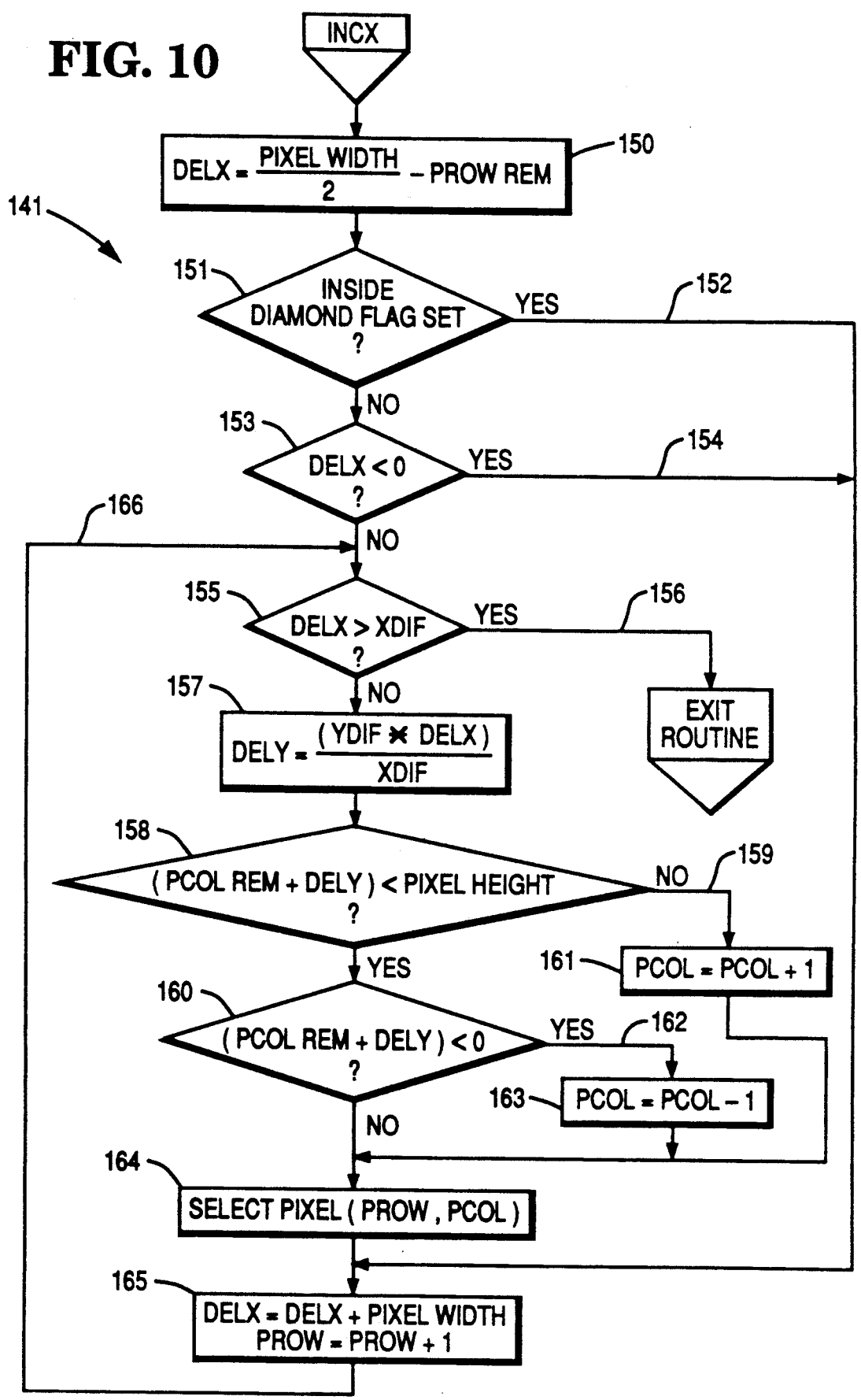
FIGS. 10–13 are flow diagrams for selecting pixels in which the active areas of the pixels are crossed by a line connecting two consecutive high resolution data points.
Figure 11:
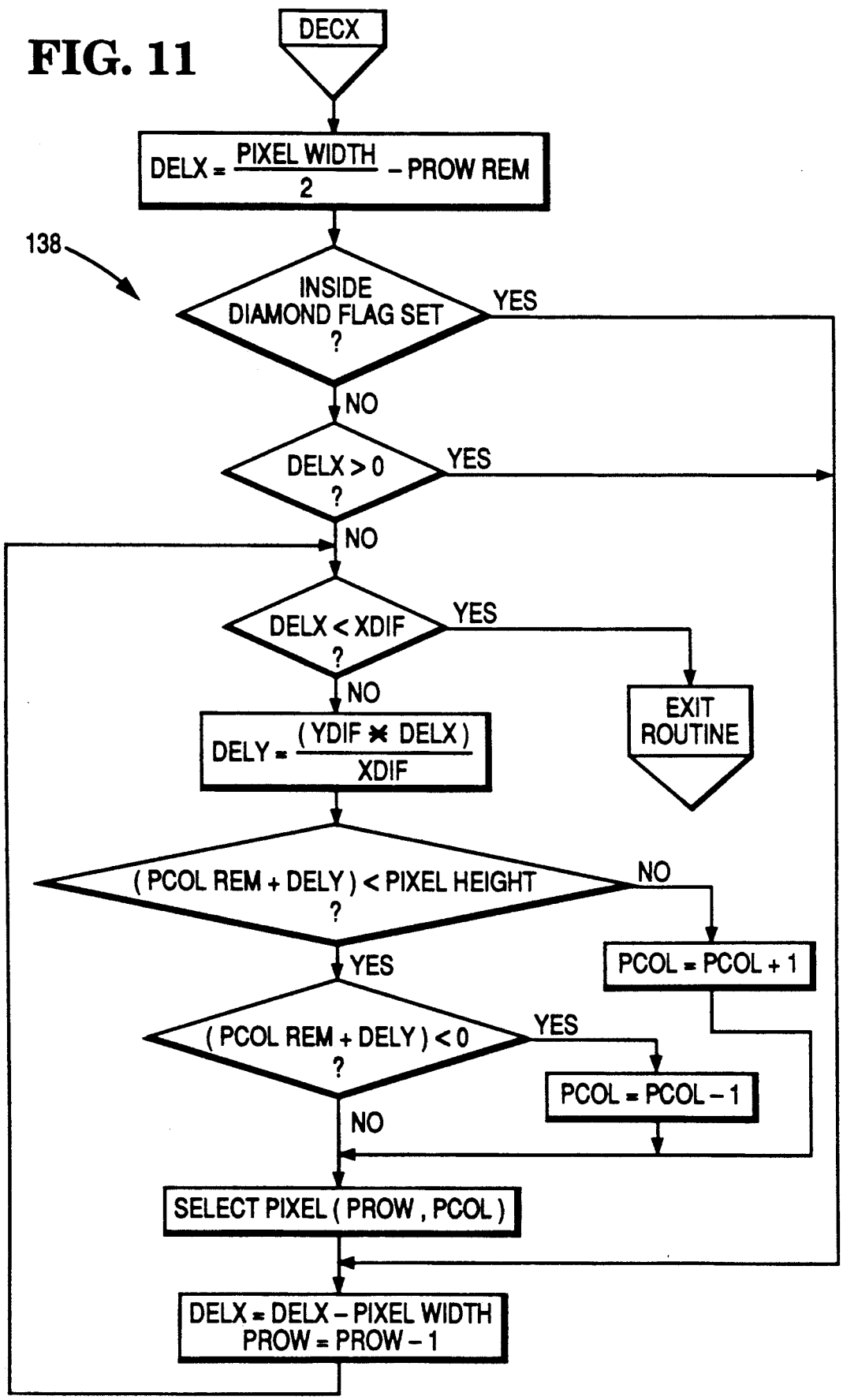
Figure 12:
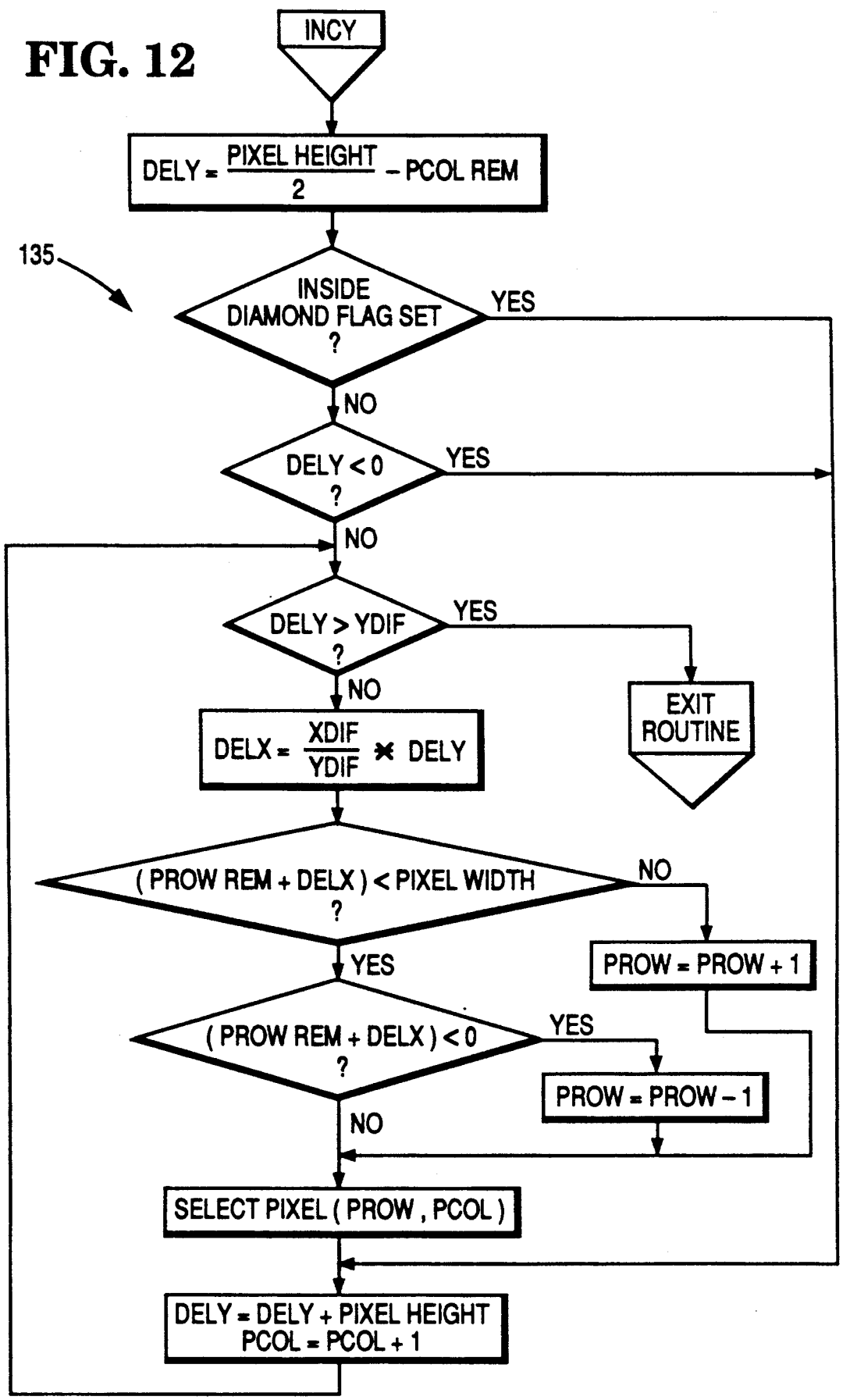
Figure 13:
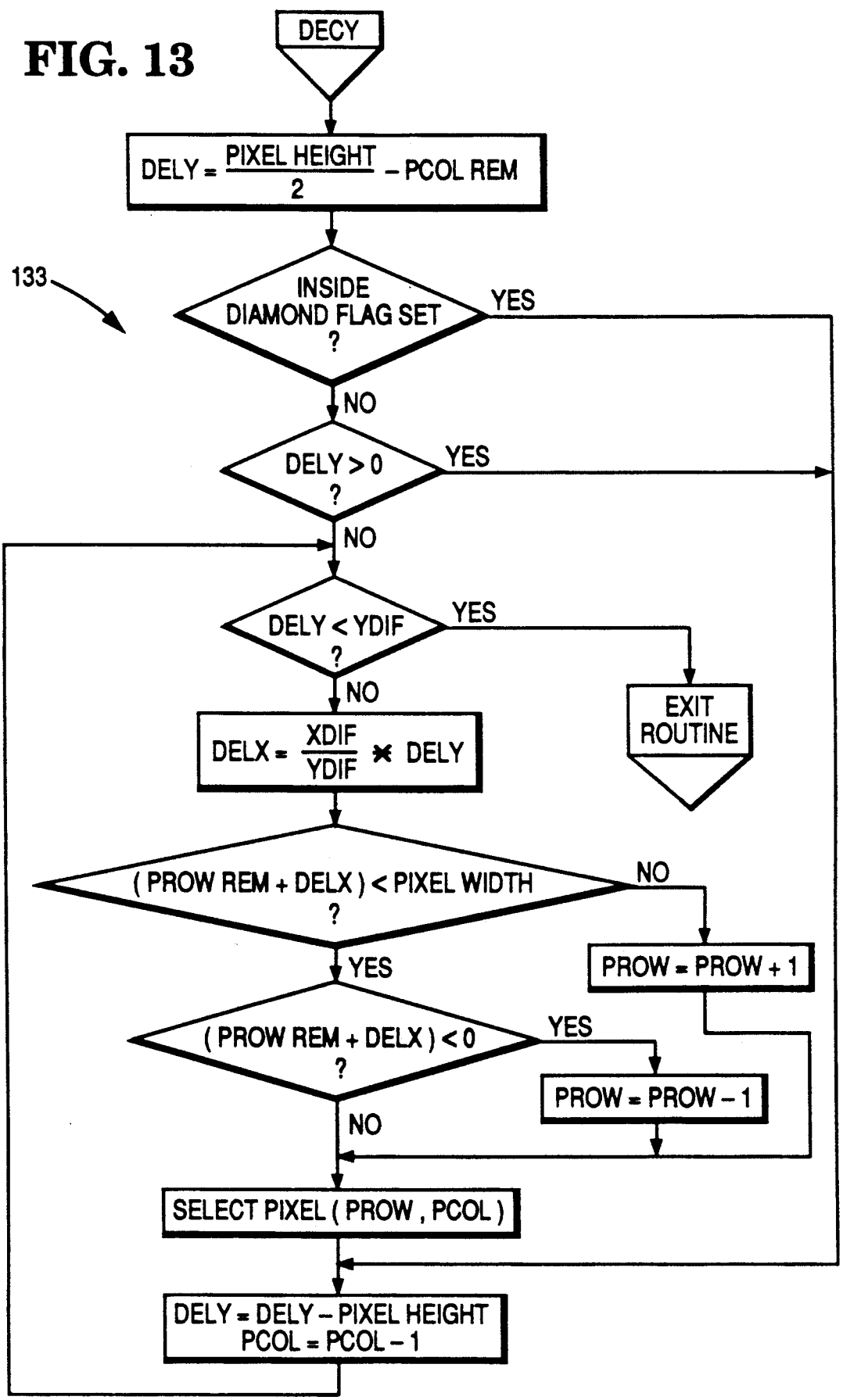

To accomplish the above task, the first block of subroutine 141 in FIG. 10 computes DELX 170 from PIXEL WIDTH 178 and ROW REM 177 according to the relation given in block 150. This results in DELX=2 which is the distance in the X direction between previous data point 109 and vertical line 172 passing through the center of pixel 105. Next in block 151, since previous point 109 is within diamond shape 110 and pixel 105 has already been selected, then the inside-diamond-flag is set. Therefore, the process continues via path 152 to block 165 in which DELX is incremented by an amount equal to PIXEL WIDTH 178 and now represents distance 171 which is equal to 10. The previous row value, PROW which was 20, is also incremented to the value of 21 so that it points to the next pixel. The process then proceeds to block 155 for checking the next pixel.

In block 155, it is determined that DELX 171 which has a value of 10 is less than XDIF 179 which has a value of 13, and the process proceeds to block 157 in which DELY 180 is calculated to have a value of 6, by multiplying YDIF 174 which has a value of 8 by DELX 171 which has a value of 10 and dividing the result by XDIF which has a value of 13. It should be noted that the division performed in block 157 is an integer division and as such all results are truncated to the nearest whole number not greater than the result. Also, if in block 155 DELX becomes greater than XDIF, then the point at which the line intersects the vertical line bisecting the pixel is outside the distance between the previous and the present point. In that case, the process exits routine 141 via path 156.

The process next proceeds to block 158 in which the sum of COL REM 176 and DELY 180, which is equal to 8, is compared against PIXEL HEIGHT 181 which also has a value of 8. Since both values are equal, this indicates that the diamond shape in pixel 107 above pixel 106 is crossed by line 111. Therefore, the process continues to block 159 where the value of previous column, PCOL, is incremented to point to pixel 106. Then the process branches to block 164 in which pixel 107 with the (PROW, PCOL) row and column coordinate values is selected as part of the pixels to represent line 111. Next, the process proceeds to block 165 in which the value of DELX and PROW are incremented to point to the next pixel, and the process then continues to block 155, where it is determined that DELX, which now has a value of 18, is greater than XDIF which is equal to 13. This signifies the end of this routine and the process returns to routine 100 in FIG. 5.

Another case in block 153 which did not apply to the above example occurs when DELX is less than zero. In that case, since the line direction is confined within region 147 of FIG. 9, and since the previous point is located outside the diamond shape in the right half of the pixel, then there is no way that the line connecting the previous point to the present point can intersect the diamond shape within the pixel. Therefore, the process branches to block 165 and then back to block 155 to check the next pixel as described earlier.

Going back to routine 100 in FIG. 5, after the completion of block 98, the process continues to block 91 where it is determined, as explained previously, that present point 112 having X-Y coordinate value (XLOC, YLOC) is located outside the diamond in pixel 107 and thus pixel 107 does not get selected by routine 100. However, pixel 107 had already been selected by routine 141 called in block 98. Accordingly, the process next proceeds to block 95 in which the present point and pixel values are assigned respectively to the previous point and pixel values. This indicates the end of routine 100 and the process returns to routine 80 in FIG. 4 in which the process continues to block 77 where it is checked to see whether the stylus tip is still in contact with the digitizing tablet surface.

While the form of the invention shown and described herein is admirably adapted to fulfill the objects primarily stated, it is to be understood that it is not intended to confine the invention to the form or embodiment disclosed herein, for it is susceptible of embodiment in various other forms within the scope of the appended claims.

What is claimed is:

1. A method for converting high resolution data into lower resolution data in the form of selected pixels in a display, comprising the following steps:
    (a) producing digitized high resolution positional data points; and
    (b) converting said digitized high resolution positional data points into lower resolution data in the form of selected pixels in the display by superimposing a single smaller shape of a predetermined geometrical configuration within the area of each of the pixels which comprise the display, and activating for display only those pixels in which the corresponding high resolution positional data points fall within the smaller shapes therein.

2. The method of claim 1, in which the geometrical configuration of said smaller shapes is generally that of a diamond.

3. The method of claim 1, in which the geometrical configuration of said smaller shapes is generally that of a circle.

4. The method of claim 1, in which the digitized high resolution positional data points are produced by a digitizer having a screen.

5. The method of claim 4, in which the digitizer screen is transparent and the display is positioned beneath the digitizer screen and is visible therethrough.

6. The method of claim 5, in which the digitizer includes electronic control circuitry and in which the method is implemented in a data processor coupled to said electronic control circuit and to said display.

7. The method of claim 6, in which a video random access memory is coupled to the data processor and the display and stores a bit mapped image for the display.

8. The method of claim 1, in which the step of converting said digitized high resolution data into lower resolution data in the form of selected pixels further includes a determination of whether or not a line between two selected data points in selected pixels in the lower resolution display crosses the smaller shapes of intervening pixels, and if so, also activating those pixels.

9. The method of claim 1, in which the pixels are square in shape.

10. A method for converting high resolution data into lower resolution data in the form of selected pixels in a display, comprising the following steps:
    (a) producing digitized high resolution data;
    (b) converting said digitized high resolution data to positional data for location of data points in a lower resolution display which comprises a matrix of pixel areas;
    (c) providing a geometric shape within each pixel area to divide each pixel area into a passive area outside the geometric shape and an active area within the geometric shape;
    (d) determining whether each data point is located in an active or passive area within its associated pixel;
    (e) selecting for activation those pixel areas having data points within active areas;
    (f) tracing a line across pixel areas of the matrix between adjacent data points; and (g) further selecting for activation those pixel areas in which lines extend across active areas.

11. The method of claim 10, in which the geometrical configuration of said smaller area is generally that of a diamond.

12. The method of claim 10, in which the geometrical configuration is generally that of a circle.

13. The method of claim 10, in which the digitized high resolution data is produced by a digitizer having a screen on which information is input by a stylus.

14. The method of claim 10, in which the display is a liquid crystal display.

15. The method of claim 11, in which the digitizer includes electronic control circuitry and in which the method is implemented in a data processor coupled to said electronic control circuitry and to said display.

16. The method of claim 15, in which a video random access memory is coupled to the data processor and the display and stores a bit mapped image for the display.

17. The method of claim 10, in which the pixels are square in shape.

18. A method for converting high resolution data into lower resolution data in the form of selected pixels in a lower resolution display, comprising the following steps:
   (a) producing digitized high resolution data by sampling and digitizing coordinate data representing a pattern produced on a digitizer;
   (b) applying the digitized sample points to a representation of a lower resolution display comprising a matrix of pixels, with each pixel having a virtual smaller shape located within the area of the pixel;
   (c) determining the relative position of each point with respect to one of the pixels and with respect to the virtual smaller shape located within the area of the pixel;
   (d) activating for display those pixels of the lower resolution display in which a digitized sample point falls within the virtual smaller shape located within the area of the pixel;
   (e) determining whether or not a virtual line segment between two sample points in selected pixels in the lower resolution display crosses the virtual smaller shapes of the intervening pixels; and
   (f) selecting and activating for display those pixels of the lower resolution display in which the virtual line segment in step (e) crosses the virtual smaller shape within the pixel.

19. The method of claim 18, in which each digitized sample point is represented by coordinate values x and y, and in which step (c) comprises:
   (c1) determining from the x and y values the pixel in which the point is located;
   (c2) determining from the x and y values the location of the point within the pixel; and
   (c3) determining whether the point is located within the virtual smaller shape in the pixel.

20. The method of claim 18, in which each digitized sample point is represented by coordinate values x and y, and in which step (e) comprises:
   (e1) determining a present point and a previous point having x and y values at the ends of the virtual line segment;
   (e2) determining the direction and inclination of the virtual line segment based upon the respective x and y values of the present and previous points;
   (e3) determining whether the virtual line segment having such direction and inclination passes through the virtual smaller shape in a pixel adjacent to the pixel in which the previous point is located; and
   (e4) continuing the determination of step (e3) for additional pixels located along the virtual line segment until the present point of the virtual line segment is reached.

* * * * *